Jan. 25, 1966  R. L. McMILLEN  3,231,558
SULFUR-AND HALOGEN-CONTAINING COMPOSITIONS
AND PROCESS FOR PREPARING SAME
Filed April 16, 1963
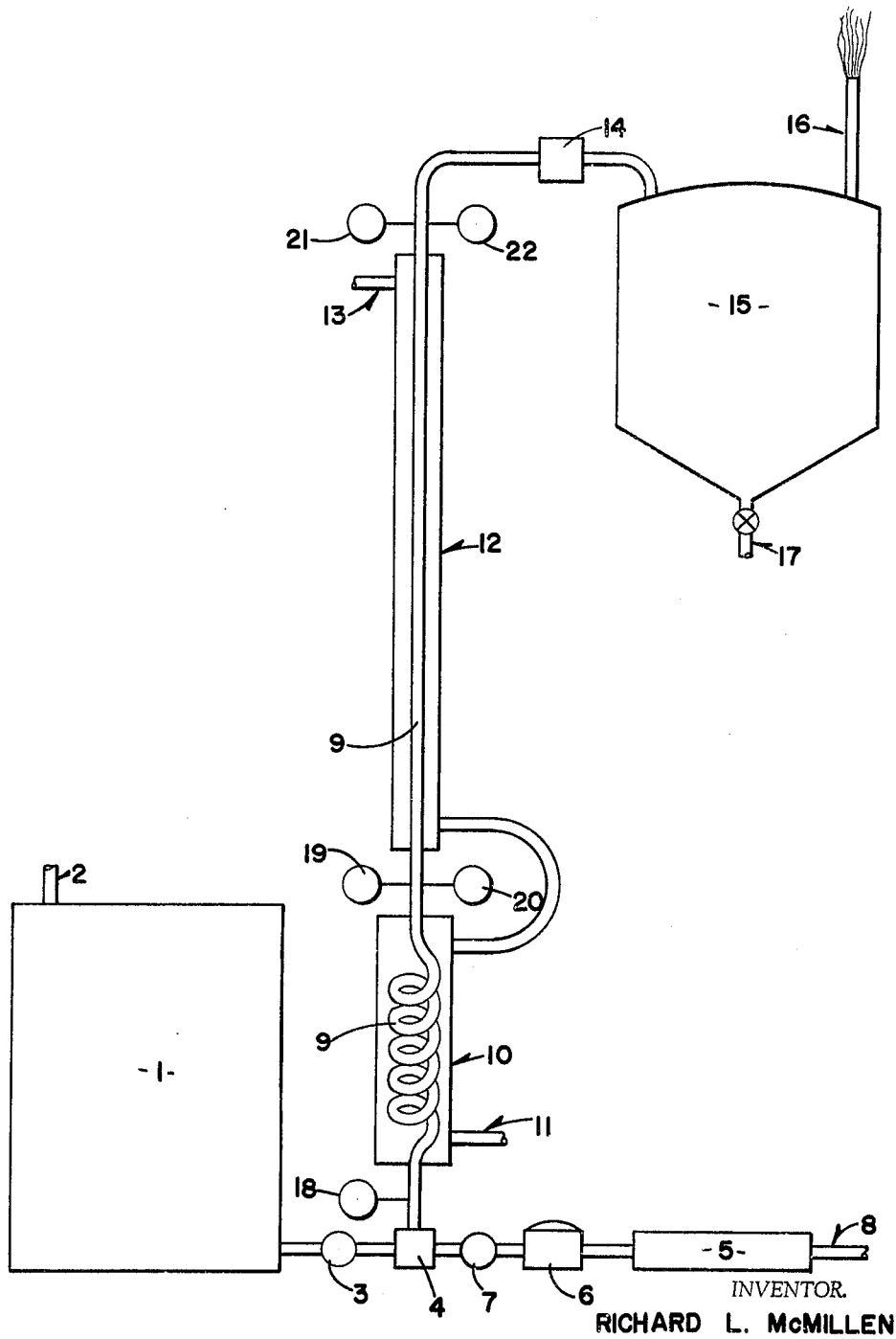
INVENTOR.
RICHARD L. McMILLEN
BY
Oberlin, Maky & Donnelly
ATTORNEYS United States Patent Office 3,231,558
Patented Jan. 25, 1966

3,231,558
SULFUR- AND HALOGEN-CONTAINING COMPOSITIONS AND PROCESS FOR PREPARING SAME
Richard L. McMillen, Painesville, Ohio, assignor to The Lubrizol Corporation, Wickliffe, Ohio, a corporation of Ohio
Filed Apr. 16, 1963, Ser. No. 273,367
8 Claims. (Cl. 260—139)

The present invention relates to an improved process for the production of sulfur- and halogen-containing compositions. It also relates to the products of such process and to their utility in the chemical and lubricant arts.

It is known to react a normally gaseous aliphatic olefin such as ethylene, propene, isobutene, etc., with a normally liquid sulfur halide such as sulfur monochloride, sulfur dichloride, etc., to prepare a sulfur- and halogen-containing composition. In the manufacture of such compositions, the gaseous olefin is usually introduced into the liquid sulfur halide at a temperature within the range of 60°–212° F. Another useful but less widely-employed process involves vaporizing the sulfur halide and mixing the vapors thereof with the gaseous olefin. Such known processes generally yield a highly colored material possessing an undesirably high acidity, shortcomings that restrict the use of the material in products such as lubricants which desirably should be light-colored and substantially non-acidic.

It is an object, therefore, of the present invention to provide an improved process for the preparation of sulfur- and halogen-containing compositions.

Another object is to provide useful sulfur- and halogen-containing compositions by a process which is both convenient and economical.

Still another object is to minimize the formation of undesirable highly colored and acidic materials during the reaction of a sulfur halide with an aliphatic olefin.

These and other objects of the invention will become apparent as the description of the invention proceeds.

The present invention resides in an improvement in the process for producing a sulfur- and halogen-containing composition by the reaction of a normally gaseous aliphatic olefin with a normally liquid sulfur halide, which improvement comprises liquefying said normally gaseous olefin, continuously introducing streams of the liquefied olefin and the normally liquid sulfur halide into a reaction zone maintained at a temperature of at least about 40° F. and at a pressure sufficient to keep the reaction mixture in the liquid state, and continuously removing the sulfur- and halogen-containing composition from the reaction zone.

The light-colored, substantially neutral sulfur- and halogen-containing compositions available from the aforesaid process are useful, for example, as improving agents for lubricating oils, especially gear lubricants and cutting oils. They are also useful as improving agents in liquid fuels and in bituminous materials such as asphalt, as ingredients in insecticidal compositions, and as chemical intermediates.

The aliphatic olefin starting material may be any normal gaseous aliphatic olefin such as ethylene, propene, butene-1, butene-2, isobutene, etc. It is often desirable to use mixtures of two or more olefins in lieu of a single olefin. Thus, it is contemplated, for example, to use commercially available mixtures of the various butenes as starting materials. For use in the process of this invention, the normally gaseous olefin must be liquefied. Liquefaction may be accomplished in the known manner, i.e., compression of the gas at a temperature below the critical temperature. Isobutene is readily liquefied, for example, by compressing it to 50 p.s.i. gauge pressure at 70° F.

The sulfur halide employed in the process is any normally liquid sulfur halide such as sulfur monochloride, sulfur dichloride, sulfur tetrachloride, sulfur monobromide, sulfur dibromide, sulfur monoxytetrachloride, thionyl chloride, thionyl bromide, etc. Sulfur chlorides such as sulfur monochloride and sulfur dichloride are preferred by reason of their low cost, availability, and excellence as starting materials for the present process. Sulfur monochloride is particularly preferred. In lieu of a single sulfur halide, it is often feasible to use a mixture of two or more sulfur halides. It is also feasible in many instances to use a solution of elemental sulfur in a sulfur halide. Thus, for example, a solution of one atom of sulfur in one mole of sulfur monochloride may be used. For the purposes of this specification and the appended claims, the term "sulfur halide" is intended to include such solutions of elemental sulfur in a sulfur halide.

Generally from about 0.1 to about 2 and preferably from about 0.2 to about 0.5 mole of sulfur halide will be employed per mole of aliphatic olefin. When less than about 0.1 mole of sulfur halide is used, the conversion to the desired sulfur- and halogen-containing product is low and much unreacted olefin remains. When substantially more than two moles of the sulfur halide is used, the product tends to become discolored and to contain a significant proportion of unreacted sulfur halide. For optimum results, the sulfur halide, and the liquefied olefin should be contacted in the reaction zone at a temperature of at least about 40° F., preferably not above about 250° F., and most desirably within the range from about 50° to about 160° F. Sufficient pressure must be maintained on the reactants to keep them in the liquid state. In the case of butenes and sulfur chlorides, a gauge pressure of at least 50 p.s.i. should be used. The reaction between an aliphatic olefin and a sulfur halide is exothermic and means for cooling should be provided, therefore, to maintain the temperature of the reaction zone within the desired range. In most instances, tap water suffices as a coolant.

As the product emerges continuously from the reaction zone, it is conveniently collected in a vessel equipped with a flare to permit the burning of any unreacted aliphatic olefin which vaporizes from the contents in the vessel. If desired, however, the vaporized aliphatic olefin may be liquefied and recycled in the process.

The sulfur- and halogen-containing compositions prepared by the process of this invention are light-colored (color not greater than about 2.5 as measured by ASTM procedure D155–45T) and substantially neutral, i.e., having an acid number not substantially greater than 10 as measured by ASTM procedure D974–55T using bromphenol blue in lieu of methyl orange as the indicator.

The following example describes a specific mode of carrying out the process of this invention. It is submitted for purposes of illustration only and is not to be construed as limiting the scope of the invention, except as the latter is defined by the appended claims.

Referring to the acompanying drawing:

Sulfur halide storage tank 1 containing sulfur monochloride is pressured by nitrogen admitted at orifice 2 causing the sulfur monochloride to flow at the rate of 40 pounds/hour, as measured by meter 3, into mixing junction 4. Simultaneously, isobutene is admitted into gas liquefier 5 via orifice 8 and the resulting liquefied isobutene is pumped by pump 6 at a rate of 60 pound/hour, as measured by meter 7, into mixing junction 4. The mixture of sulfur monochloride and isobutene flows continuously through reaction zone 9, a nickel-iron-molybdenum alloy tube having an inside diameter of 0.359 inch and an outside diameter of 0.546 inch, said tube having a total length of 40 linear feet and being surrounded by heat exchange jackets 10 and 12, into which water at 100° F. enters at orifice 11 and exits at orifice 13. The exit water is found to have a tempearture of about 160° F. The temperatures within the reaction zone 9 are monitored by thermometers 18, 19, and 21 and are found to be within the range of 100°–160° F. The pressure within the reaction zone is monitored by pressure gauges 20 and 22 and is found to be 100 p.s.i. gauge. Back-pressure regulator 14 serves to control the pressure at the desired level. The continuously formed reaction product of isobutene and sulfur monochloride empties into collecting vessel 15, which is fitted with a flare 16 to burn any vaporized isobutene and a product draw-off valve 17. After the continuous unit has run for 10.5 hours, it is shut-down and the product is sampled. The product is found to have the following analyses:

| | |
|---|---|
| Percent sulfur | 26.7 |
| Percent chlorine | 24.9 |
| Neutralization No. (ASTM D974–55T using bromphenol indicator) acid | 0.7 |
| Color (ASTM D155–45T) | −2 |

As indicated earlier, the products of the present invention are useful as improving agents in lubricating oils. For such use, generally from about 0.1 to about 15 percent and more often from about 0.5 to about 5 percent of a product of the invention is dissolved in a suitable lubricating oil such as a mineral oil, a vegetable or animal oil, or a synthetic oil such as dioctyl sebacate, dinonyl adipate, etc. A solvent-refined Mid-Continent oil having a Saybolt viscosity of 120 seconds at 100° F. and containing 3.5 percent by weight of the above-described isobutene-sulfur monochloride reaction product makes a good cutting oil for use in metal working operations. Likewise, a SAE 90 grade gear oil containing 1.0 percent of the above-described isobutene-sulfur monochloride reaction product serves as an extreme-pressure lubricant for gears.

The products of this invention are also useful as chemical intermediates in that the halogen atoms therein provide reactive sites for the introduction of various organic or inorganic groups into the molecule. For example, the reaction product of isobutene and sulfur monochloride reacts with a metal phenate to split out metal halide and form a sulfur compound containing aryloxy substituents.

What is claimed is:

1. In the process for producing a sulfur- and halogen-containing composition by the reaction of a normally gaseous aliphatic olefin with a normally liquid sulfur halide selected from the class consisting of sulfur chlorides and sulfur bromides, in combination therewith the improvement which comprises liquefying said normally gaseous olefin, continuously introducing streams of the liquefied olefin and the normally liquid sulfur halide into a reaction zone maintained at a temperature of from about 40° F. to 250° F. and at a pressure sufficient to keep the reaction mixture in the liquid state, and continuously removing the sulfur- and halogen-containing composition from the reaction zone.

2. A process in accordance with claim 1 wherein the reaction zone is maintained at a temperature within the range from about 50° to about 160° F. and a gauge pressure of at least 50 p.s.i.

3. A process in accordance with claim 1 wherein there is present in the reaction zone from about 0.1 to about 2 moles of normally liquid sulfur halide selected from the class consisting of sulphur chlorides and sulphur bromides per mole of liquefied olefin.

4. A process in accordance with claim 1 wherein the liquefied olefin is a liquefied butene.

5. A process in accordance with claim 1 wherein the liquefied olefin is liquefied isobutene.

6. A process in accordance with claim 1 wherein the normally liquid sulfur halide is a sulfur chloride selected from the group consisting of sulfur monochloride and sulfur dichloride.

7. A process in accordance with claim 1 wherein the normally liquid sulfur halide is sulfur monochloride.

8. A process in accordance with claim 2 wherein the normally liquid sulfur halide is sulfur monochloride and the liquefied olefin is liquefied isobutene, there being present in the reaction zone from about 0.2 to about 0.5 mole of sulfur monochloride per mole of liquefied isobutene.

References Cited by the Examiner
UNITED STATES PATENTS

| | | | |
|---|---|---|---|
| 2,422,275 | 6/1947 | Winning et al. | 260—139 |
| 2,497,138 | 2/1950 | Rogers | 260—139 |
| 2,708,199 | 5/1955 | Eby | 260—139 |

CHARLES B. PARKER, *Primary Examiner.*